May 18, 1965

W. HAMILTON 3,183,873

HATCH COVER ACTUATOR

Filed Jan. 18, 1963

INVENTOR.
WALLACE HAMILTON
BY
Oberlin, Maky & Donnelly
ATTORNEY

INVENTOR.
WALLACE HAMILTON
BY
Oberlin, Maky & Donnelly
ATTORNEY

INVENTOR.
WALLACE HAMILTON
BY
*Oberlin, Maky & Donnelly*
ATTORNEY

United States Patent Office 3,183,873
Patented May 18, 1965

3,183,873
HATCH COVER ACTUATOR
Wallace Hamilton, Bentleyville, Ohio, assignor to
PneumoDynamics Corporation, Cleveland, Ohio, a
corporation of Delaware
Filed Jan. 18, 1963, Ser. No. 252,434
4 Claims. (Cl. 114—201)

This invention relates in general to hatch covers and more particularly to new and improved actuator means for preventing scrubbing of the resilient sealing gasket carried by the cover when moved between its closed and open positions.

The sealing gasket is provided to maintain a watertight closure between the hatch cover and the coaming, the gasket accordingly extending around the entire periphery of the cover, and scrubbing as well known in the art refers to the friction during opening and closing of the cover between its sealing gasket and the cooperable stationary gasket supporting strip which forms part of the hatch coaming. Such friction, which is particularly pronounced adjacent the hatch cover hinge axis, is clearly undesirable, leading to breakdown of the gasket and consequent leakage through the joint.

With the above in mind, it is a primary object of the present invention to provide a hatch cover the actuation of which will be free from scrubbing of the sealing gasket on the gasket supporting strip, particularly in that portion of the gasket near the hatch cover hinge axis.

A further object of the invention is to insure that the hatch cover and the sealing gasket carried thereby in the area adjacent the hatch cover hinge axis are vertically raised or jacked from the gasket supporting strip prior to the opening of the hatch cover and that the gasket is retained in such position out of contact with said supporting strip in such area until the hatch cover has reached a fully closed position.

A further, more specific, object is to provide hatch cover raising or jacking means which forms part of the hatch cover actuating system, thereby providing a highly simplified structure ensuring sequential operation of jacking and opening, in that order, of the hatch cover when moving to an open position, and closing and de-jacking when the cover is moved to the closed position.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
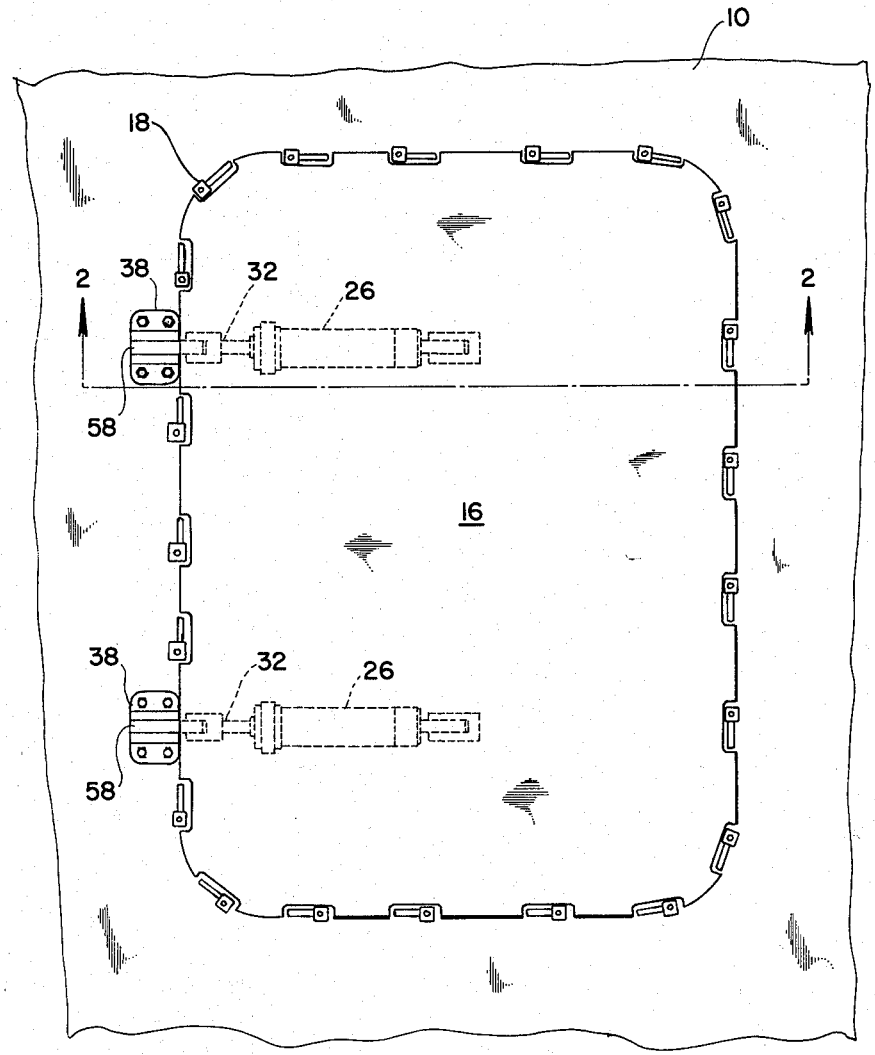
FIG. 1 is a plan view of the hatch cover and the actuator therefor which forms the present invention.
Figure 2:
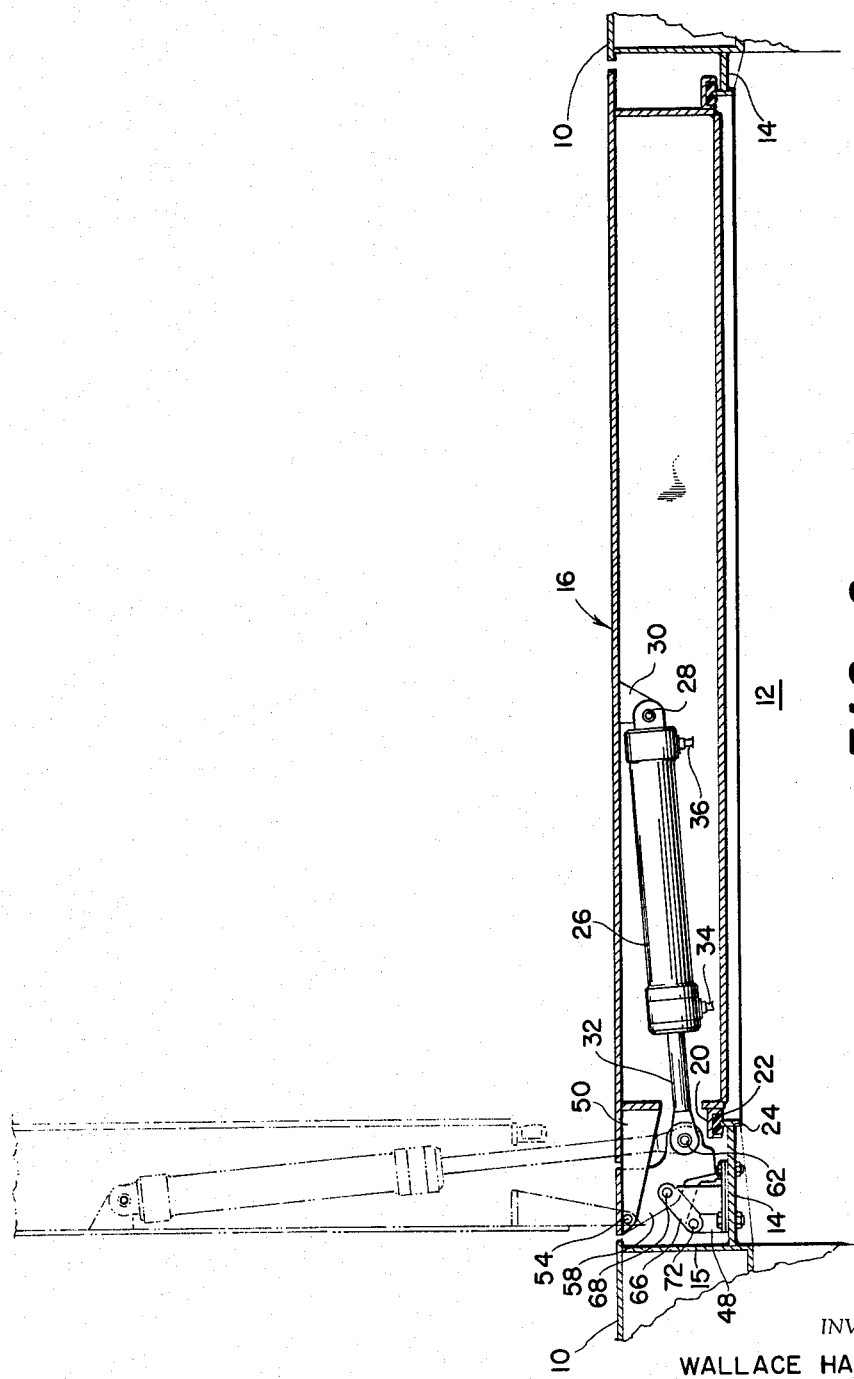
FIG. 2 is a vertical sectional view taken on line 2—2 of FIG. 1, the solid lines illustrating the hatch cover in a closed position and the dotted lines representing the hatch cover in an open or stowed position.

Referring now to the drawings, wherein like parts are designated by like reference characters, and initially to FIGS. 1 and 2 thereof, reference numeral 10 indicates the deck of a ship in which there is a hatchway 12, the latter having therein a flange 14 which is rigidly secured, e.g., by welding, to a vertical coaming member 15. The coaming flange 14 serves to support a hatch cover generally indicated at 16, which is adapted to selectively open or close the hatchway. The top surface of the hatch cover 16 when said cover is in a closed position preferably lies flush with the deck 10, such closed position being maintained by suitable dogging means 18 which forms no part of the present invention.

The hatch cover 16, which in the form shown is of the single panel type, is provided adjacent the lower portion thereof with a peripherally extending channel 20 of inverted U shape, and this channel 20 carries a resilient sealing gasket 22 therein. When the hatch cover is in the closed position, the gasket 22 contacts and is deformed by a gasket supporting strip 24 secured about the inner edge of flange 14, whereby the cover is sealed in the hatchway.

A pair of spaced hydraulic cylinders 26 are provided for actuating the hatch cover, with each cylinder 26 being pivoted as shown at 28 to mounting lugs 30 which are secured, e.g., by welding, to the inside face of the top of the hatch cover and depend downwardly therefrom. The hydraulic cylinders 26 are provided with double acting pistons (not shown) and piston rods 32, the latter being operatively connected to the linkage forming part of the hatch cover actuating assembly in a manner to be more specifically described hereinbelow. The cylinder is additionally provided with hydraulic fluid lines 34 and 36 for conducting fluid to and from the cylinder for drive of the pistons in the usual manner.

Since the actuating assemblies operatively connected to the piston rods 32 are identical in structure, only one such assembly need be described. Referring now to one of such actuating assemblies, and particularly to FIGS. 3–5, a hinge base 38 is mounted on the flange 14 preferably by bolt and nut means 40 and 42, respectively. Securely mounted on the hinge base 38 and extending upwardly therefrom are stop members 44 and 46, the purposes of which will become more apparent hereinafter, the stop member 44 forming part of a bearing support member 48 disposed between the fixed stop members 46. The stop member 44 includes an inclined portion 45 which serves a force absorbing function while the cover is in position other than horizontal, as will hereinafter be further explained.

The hatch cover 16 is provided with a pair of spaced hinge blades 50 secured to the hinged end of the hatch cover, such blades being secured, e.g., by welding, to the hatch cover. The hinge blades 50 are provided with circular hinge pin-receiving openings 52 which receive hinge pins 54, such pins being held in place by means of set screws 56.

Disposed between the hinge blades 50 and pivotally mounted on said hinge pin 54 is a hinge lever 58, the top surface of which lies flush with the top surfaces of the hatch cover 16 and hinge blades 50. The opposite end of the hinge lever 58 is pivotally connected to piston rod 32, such pivotal connection being in the form of a pivot pin 62 which extends through aligned openings in the lever 58 and clevis 64, the latter being rigidly secured to the rod 32 by any suitable means (not shown). The hinge lever 58 is formed with a substantially vertical abutment surface 59 for contact with the fixed stop member 44 when the hinge lever 58 is rotated clockwise about pin 54. It will thus be seen that reciprocal movement of rod 32 will result in rotation of hinge lever 58 about hinge pin 54. It will also be seen that outward movement, to the left as viewed in FIG. 3, of hinge lever 58 is limited by the fixed stop 44.

The hinge lever 58 is operatively connected to the fixed bearing support member 48 through means of two parallel hinge links 66 disposed on either side of the hinge lever 58, with a pin 68 pivotally connecting said links 66 at corresponding ends thereof to lever 58. Pin 68 is threaded at both ends thereof with nuts 70 retaining pin 68 in such pivotally connecting position. The opposite ends of hinge links 66 are pivotally connected to the bearing support member 48 through a similar pin connection comprising pin 72 and end nuts 74. The axis of the pin 68 is at all times above the axis of pin 72, whereby outward movement of lever 58 will cause the links 66 to pivot counterclockwise about pin 72 and result in raising of the lever 58. Fixed stops 46 limit the clockwise movement of the links 66 about pin 72, while fixed stop 44 effectively limits the counterclockwise movement of the links.

Figure 4:
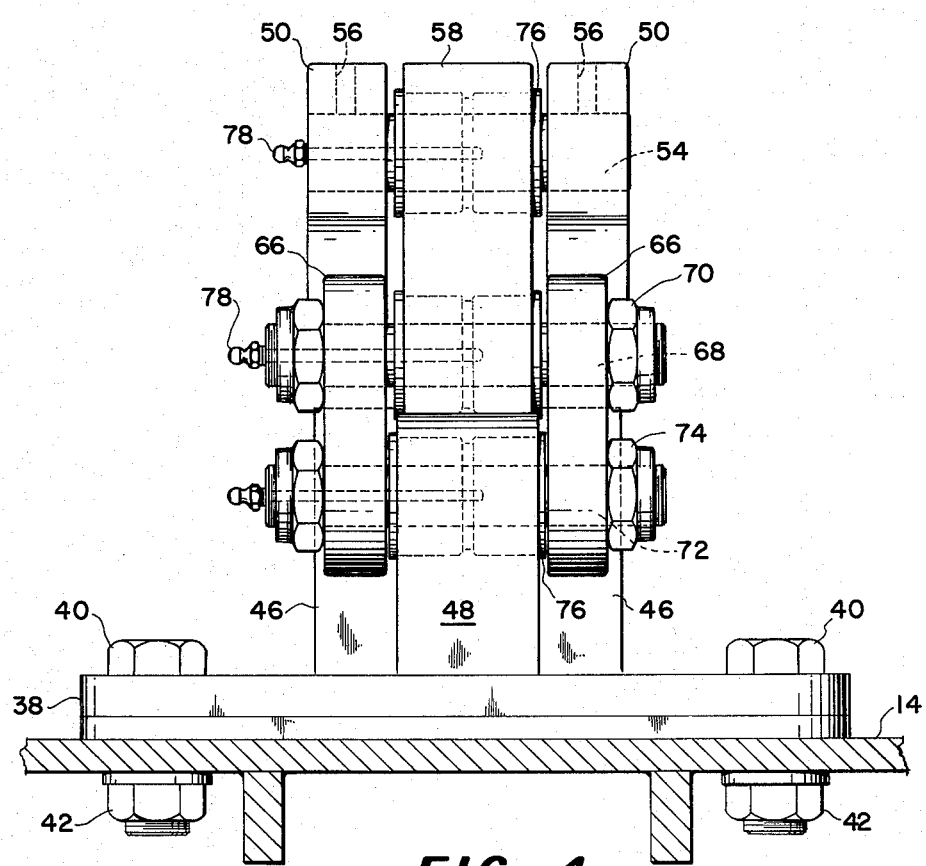
FIG. 4 is an enlarged end view taken on line 4—4 of FIG. 3.
Figure 5:
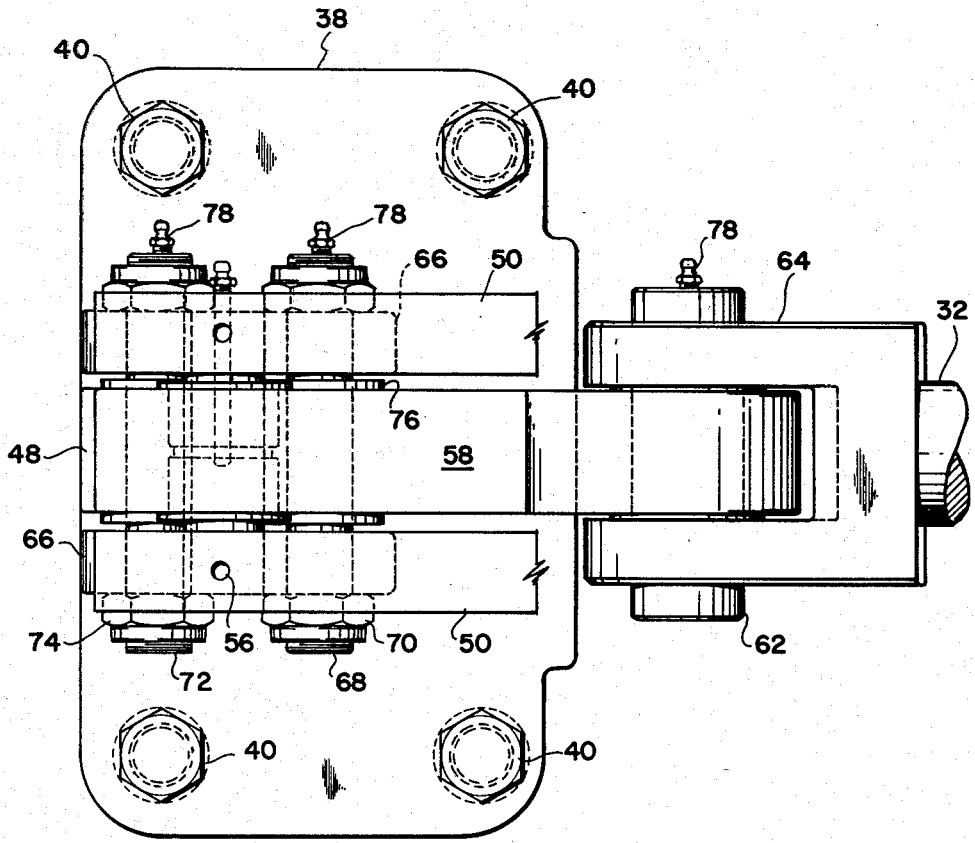
FIG. 5 is an enlarged plan view of that portion of the actuator shown in FIGS. 3 and 4.

As best seen in FIGS. 4 and 5, bushings preferably of bronze and designated at 76 are provided about pins 54, 62, 68 and 72 and conventional lubrication fittings commonly designated at 78 are provided to lubricate the area between the pins and the members pivotally mounted thereon.

Figure 3:
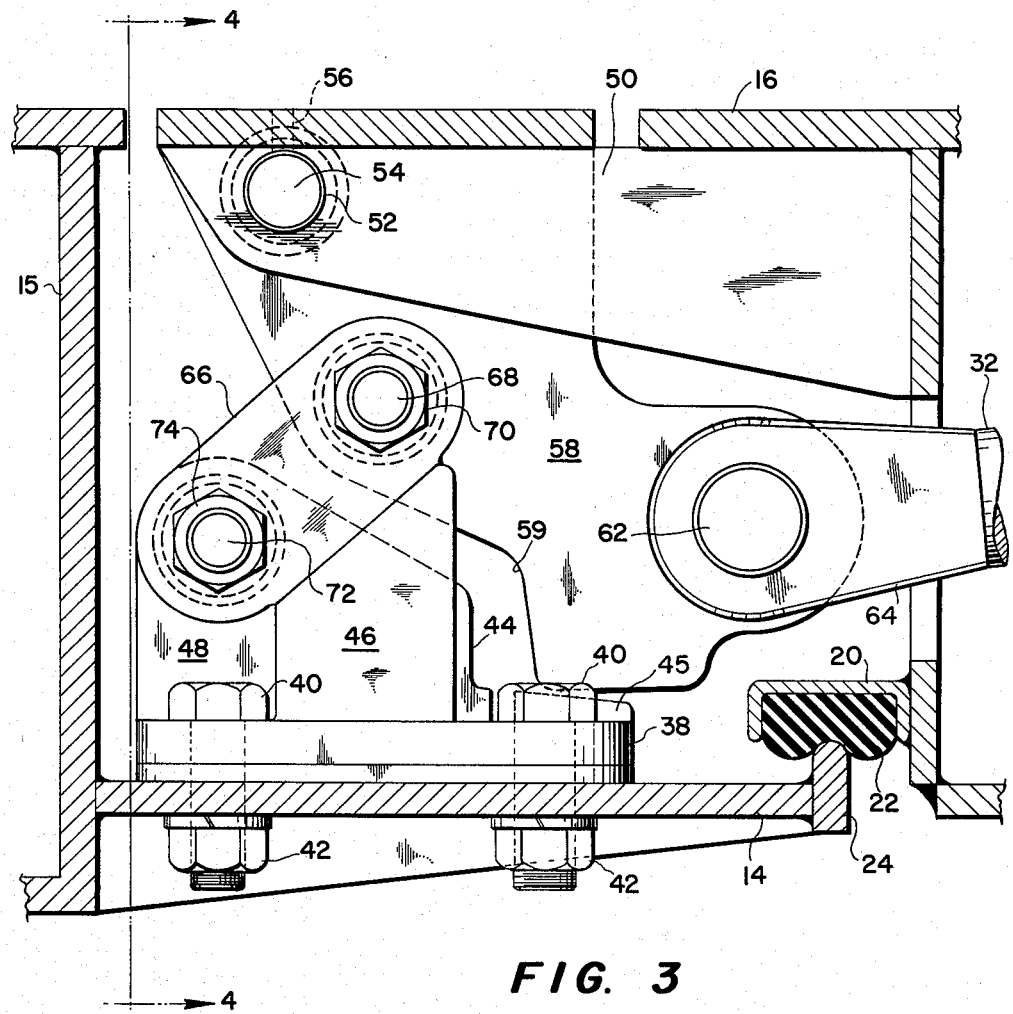
FIG. 3 is a fragmentary enlarged view of a portion of FIG. 2, showing more clearly that portion of the hatch cover actuator for jacking the hatch cover.

Referring now to the operation of the hatch cover actuating mechanism of the invention, when it is desired to move the hatch cover 16 from the closed solid line FIG. 2 position to the raised or open position shown in dotted lines, hydraulic fluid under pressure is supplied to the cylinders 26 through fluid lines 36 whereby the piston rods 32 are forced outwardly or to the left as viewed in FIGS. 2 and 3. Such movement of rods 32 will, through the pivotal connections described hereinabove, cause hinge levers 58 to rotate clockwise about hinge pins 54. Such clockwise movement is arrested when the substantially vertical abutment surfaces 59 of the levers 58 contact the fixed stops 44. Such clockwise movement will also cause the bottom of the hinge levers 58 to contact the inclined portions 45 of the fixed stops 44, the inclined portions 45 serving to support the levers during subsequent rotative movement of the hatch cover. As levers 58 thus move clockwise, hinge links 66 will rotate counterclockwise about pins 72. It will be seen that as hinge links 66 are pivoted about stationary pins 72, the pins 68 will move upwardly, and that such upward movement will cause hinge levers 58 to be likewise raised. This raising of hinge levers 58 will of course lift the hinge pins 54 which in turn raise the hinge blades 50 and hence the hatch cover 16, whereby the sealing gasket 22 is vertically lifted or jacked from the supporting strip 24. Thus, before the hatch cover 16 begins to swing upwardly, the above-described mechanism ensures that the portion of the sealing gasket 22 at the side of the hinge connections will be vertically raised to a position out of contact with the gasket supporting strip. As mentioned above, and as well known to those skilled in the art, it is that portion of the sealing gasket adjacent the hinge axis or pin where scrubbing is the most pronounced. The present invention completely eliminates such scrubbing.

Subsequent to the contact between the vertically extending portion 59 of the hinge levers 58 and the fixed stops 44, continued outward movement of piston rods 32 will cause the hatch cover to swing to its open position, the latter being shown in dashed lines in FIG. 2. It should be noted that for the balance of such opening movement the hinge levers 58, the hinge links 66, and the fixed supporting structure connected thereto constitute a unitary assembly, as a result of the noted engagement of the levers 58 with stops 44 and 45, which is maintained throughout the cover opening movement. It should further be noted that while the hatch cover is maintained in its open, FIG. 2 dashed line position, the load of the hatch cover is absorbed by the fixed supporting structure through the engagement of the levers 58 with the fixed stops 44 and 45 thereby significantly decreasing the stresses otherwise existent in the linkage assembly.

When it is desired to move the open hatch cover 16 to the closed position, hydraulic fluid is supplied to lines 34 to drive the piston rods 32 inwardly relative to the hydraulic cylinders 26, whereby the hatch cover rotates clockwise about the hinge assemblies. Until such time as the piston rods assume their substantially horizontal positions, abutment surfaces 59 of hinge levers 58 will remain in contact with the fixed stops 44 and the inclined portions 45 thereof whereby the sealing gasket 22 adjacent the hinge pin 54 is held in the relatively raised or jacked position. As the hatch cover 16 closely approaches its horizontal, flush position, the piston rods 32 will have entered the cylinders 26 sufficiently to effect movement of the levers about hinge pins 54 to the right as viewed in FIG. 3. Such movement will lower the pins 68 and therefore the hinge levers 58 and the hinge blades 50. The lowering of the hinge blades 50, and the hatch cover 16 which they form a part of, reforms the sealing relationship between the gasket 22 and the supporting strip 24. This lowering of hinge levers 58 is limited by the contacting of the links 66 with the fixed stop members 46, as previously mentioned, and it will be seen that that portion of the sealing gasket adjacent the hinge pins 54 will thus not be lowered until at the very end of the closing of the hatch cover.

It will accordingly be seen that the actuator of the present invention eliminates scrubbing of the sealing gasket during both opening and closing movement of the hatch cover. The elimination of such scrubbing of the sealing gasket in that region thereof which has heretofore been most pronounced greatly lengthens the life of the gasket, thereby rendering more infrequent the relatively costly and time consuming replacement of this gasket. Moreover, by incorporating the jacking or raising means in the actuation mechanism for the hatch cover, there is an assurance that such portion of the seal will always be lifted or jacked as the first step in opening of the hatch cover and lowered as the last action in closing of the cover.

Other modes of applying the principle of the invention may be employed, change being made as regards the details described, provided the features stated in any of the following claims or the equivalent of such be employed.

I therefore particularly point out and distinctly claim as my invention:

1. In deck structure defining a hatch opening, hatch cover means adapted to close said hatch opening, one of said hatch cover means and the deck structure carrying a peripheral resilient sealing device, the other of said hatch cover means and deck structure having a surface opposed to said sealing device for engagement therewith when the hatch cover means is in a closed position to effect a watertight seal thereof, a hinge lever pivotally connected to said hatch cover means, power actuating means having one end operatively connected to said hatch cover means and the opposite end operatively connected to said hinge lever, and link means having one end pivotally connected to said hinge lever and an opposite end pivotally connected to said deck structure, whereby when said hatch cover means is in a closed position, said power actuating means first lifts said hinge lever and said hatch cover means pivotally connected thereto away from the deck structure thereby to break said seal and thereafter swings said hatch cover means to an open position.

2. The combination of claim 1 wherein said hatch cover means includes hinge blades pivotally connected to said hinge lever means.

3. The combination of claim 1 wherein said deck structure includes stop means for limiting movement of the hinge lever means relative thereto.

4. The combination of claim 1 wherein the axis of the pivotal connection between said hinge lever and said link means is above the pivotal connection of the latter with the deck structure and vertically intermediate the respective pivotal connections of the hinge lever with said hatch cover means and with said power actuating means.

References Cited by the Examiner

UNITED STATES PATENTS 2,719,036 9/55 Brundage _____ 268—74

FOREIGN PATENTS 48,744 1/40 Netherlands.
1,134,611 8/62 Germany.

MILTON BUCHLER, *Primary Examiner.*
ANDREW H. FARRELL, *Examiner.*